June 5, 1928.
C. H. KEPLER
1,672,324
WIRE THREADING LEADER AND COUPLER
Filed Oct. 23, 1925
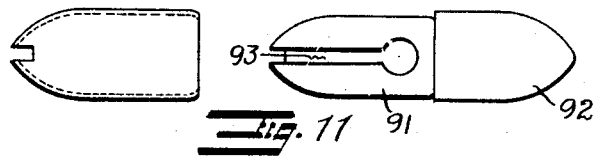
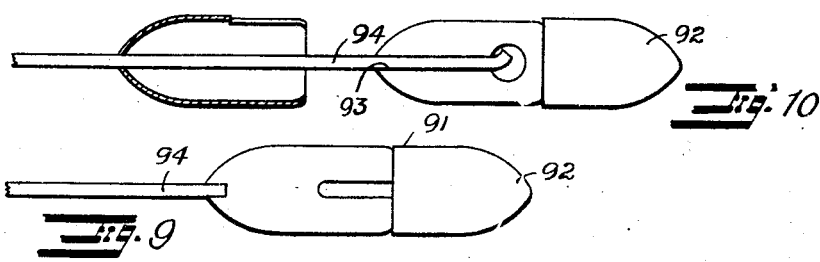
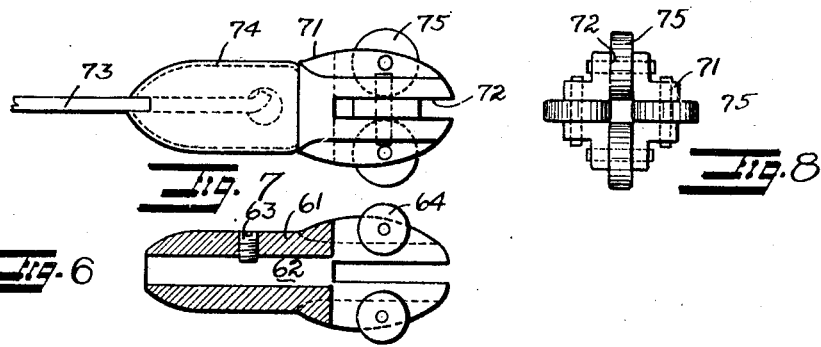
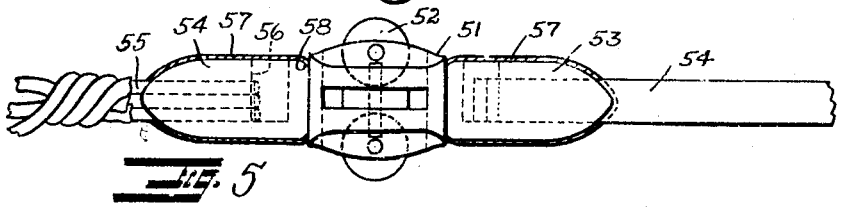
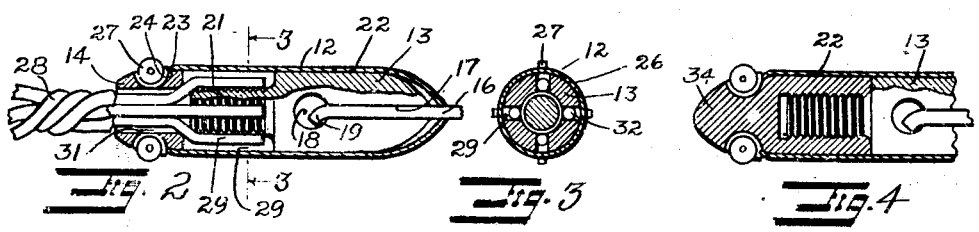
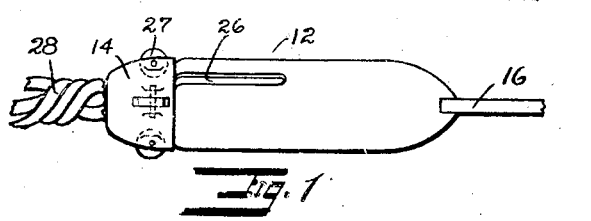
INVENTOR.
CLAUDE H. KEPLER
BY Joseph B. Gardner
ATTORNEY.

Patented June 5, 1928.

1,672,324

UNITED STATES PATENT OFFICE.

CLAUDE H. KEPLER, OF OAKLAND, CALIFORNIA.

WIRE-THREADING LEADER AND COUPLER.

Application filed October 23, 1925. Serial No. 64,362.

My invention relates to a device designed to be used to facilitate the passing of lead lines, wires and cables through conduits or the like.

An object of the invention is to provide a device of the character described which may, with equal readiness, be either pushed, or pulled through a conduit.

Another object of the invention is to provide a device of the character described which will pass freely through a conduit and which is so formed that it cannot become caught therein.

A further object of the invention is to provide a device of the character described which is arranged for the removable attachment of wires or cables thereto and which serves as a coupling between a leading and a following wire or cable section.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a side view showing one embodiment of the device of my invention, with a lead wire and follower cable fixed therein.

Figure 2 is a longitudinal sectional view of the device shown in Figure 1.

Figure 3 is a transverse sectional view taken on the line 3—3 in Figure 2.

Figure 4 is a fragmentary sectional view of a modification of the embodiment of Figure 1.

Figures 5 and 6 are longitudinal sectional views of other embodiments of the invention.

Figures 7 and 8 are side and front views respectively of still another form of the invention.

Figure 9 is a side view of a simplified form of the device shown in Figure 7.

Figure 10 is a longitudinal sectional view of the device of Figure 9 with the parts thereof separated along a lead wire.

Figure 11 is a side view of the separated parts of the device shown in Figure 9.

In wiring installations involving the use of conduit, the usual and preferred proceeding is to first install the conduit and then draw or shove the wires into place therein. Owing to the fact that the wires or cables to be installed are frequently of such size as to fit the conduit bore snugly or are not stiff enough to be pushed into the conduit, it is usually necessary to draw the same into the conduit by the aid of a lead line of suitable size and strength, and it is to a means for effecting the primary passing of the lead line and the wires that my invention particularly relates.

Lead lines are usually of comparatively stiff wire formed either round or as a ribbon, and in pushing such lines into a conduit, it is customary to either round off or to form a return bend in the forward end of the wire. But, in either event, the guide point thus provided will tend to catch against any projections in the conduit or in the cracks between the various lengths of the conduit and thus retard the progress of the wire, while in the latter event, the frictional resistance is usually also increased by reason of the necessary size of the bend which causes its close fit in the conduit. In accordance with my invention, however, a detachable torpedo-like guide point for a lead wire is provided which is not only arranged to pass through conduit without catching and with a minimum of friction, but is also arranged for the removable attachment of a follower wire thereto.

As shown in Figures 1 to 3 inclusive, the device of my invention comprises a lead wire guide 12 having a body portion 13 and a nose portion 14. The portion 13 is preferably of cylindrical form and is arranged for longitudinal attachment to a lead wire 16. As here shown, the wire 16 is of ribbon form, and the rear end of the portion 13 of the device is provided with a transverse slot 17 passing through its axis and in which the the wire 16 is arranged to fit. The wire 16 may be secured in the slot 17 in any suitable manner, the slot being here shown provided with an enlarged portion 18 at its forward edge in which the bent tip portion 19 of the wire 16 is arranged to be positioned, longitudinal withdrawal of the wire being prevented by contact of the tip 19 with the sides of the slot portion 18 in an obvious manner. As here shown, the forward end of the portion 13 is provided with a threaded longitudinal extension 21 on which the cylindrical nose portion 14 is arranged to be screwed.

Means are provided for preventing the lateral escape of the wire 16 from the slot 17, such means being here shown as comprising a cap or shell 22 perforated to allow the passage of the wire 16 therethrough and preferably arranged to closely overlie the entire portion 13 and the rearward part of the portion 14 when the portions are in assembled relation. It will now be noted that when it is desired to fix the wire 16 in the device, it is merely necessary to back the shell a slight distance along the wire, engage the wire end in the slot 17, and then bring the shell forward to cover the slot and so prevent the lateral escape of the wire from the slot. The shell may be held in desired fixed relation to the portions in any desired manner, but as here shown, its forward edge 23 is crimped inwardly to engage an annular groove 24 provided in the portion 14, the forward portion of the shell being preferably provided with a longitudinal slot 26 terminating at the edge 23 to provide for the releasable and resilient engagement of the edge in the groove. It will now be noted that the portion 13 and shell 22 are tapered at their opposed ends and that the side wall defined thereby is continuous, so that no sharp edge will be presented against the inside surface of a conduit through which the device may be moved. Mechanical means providing for a minimum of friction between the device and the inside wall of a conduit are also provided, such means being here shown as comprising a plurality of radially extending wheels or rollers 27 mounted in the nose portion 14 of the device.

Since the lead wire, when it has been passed through a conduit, is intended for use in pulling a follower wire 28 into place in the conduit, means are provided for attaching such wire directly to the device in longitudinal relation thereto. As here shown, the rearward part 29 of the nose portion 14 which engages the threaded extension 21 of the portion 13 is provided with a plurality of radial and longitudinally extending slots 29, while the nose 14 is provided with an axial perforation 31 arranged to receive the ends of the strands 32 of the wire 28. In fixing the wire 28 in the device, it will now be noted that the various strands 32 of the wire 28 are inserted through the perforation 30 from the head end thereof, and are bent outwardly in the various slots. Screwing of the nose 14 onto the threaded part 29 of the portion 13, it will now be noted, will lock the strands between the material of the nose at the inner forward edge of the slots and the end of extension 21, it being obvious that the shell 22 must be backed off from at least the nose portion during the fastening operation. When the strands have been sufficiently locked in position in the manner indicated, their ends are preferably pushed inwardly into the various slots 29 so that the shell 22 may be positioned and held thereover in the manner previously described, it being noted that any gap between the portions 13 and 14, as well as the slots 29, will thus be covered.

In the embodiment of Figure 4, the nose portion 34 thereof is not arranged to receive and hold a follower wire, and therefore lacks the wire gripping structure of the embodiment of Figures 1 to 3. The nose portion 34 is otherwise the same as nose portion 14, so that these parts may be interchangeably mounted on the body portion 13. In this manner, the nose 34 may be used in shoving the lead ribbon forwardly through the conduit while the wire gripping nose 14 may be used in drawing a follower wire back through the conduit.

In the embodiment of Figure 5, the nose and body portions are integral, the device comprising a body 51 having conically tapered ends and provided with a plurality of protruding rollers 52 mounted in its midportion. One end 53 of the body is arranged to receive and hold the end of a wire ribbon 54 in the same manner as the lead wire is held in the previously described embodiment, while the other end 54 of the body is similarly slotted to receive a plurality of wire strands 55 arranged in coplanar and parallel relation and having their ends turned sharply to engage an edge or seat 56 provided at the rearward end of the slot. Caps 57 are utilized to hold the ribbon and strands in their respective slots, the caps being crimped at their inner ends to engage in grooves 58 provided in the body 51. The larger size of wheel permitted in this embodiment still further tends to eliminate friction.

In the embodiment of Figure 6, I have shown a one-piece body structure so arranged that a wire may completely extend therethrough. In this embodiment, the body 61 is provided with a longitudinal perforation 62 arranged to receive a wire (not shown), a set screw 63 being provided for fixing the wire in the perforation, and wheels 64 being provided as an anti-friction element. This embodiment, it will be noted, while it does not provide a coupling means, may also be used at intermediate points on a wire or cable to facilitate movement thereof through a conduit, and in the case of heavy cables, may be advantageously left on the cable when it is installed to facilitate possible future removal thereof. It will be noted that no cap or shell is necessary.

As illustrated in Figures 7 and 8, a device is shown having a body 71 provided with radial slots 72 in which wheels 73 are mounted to extend outwardly of the body. The rear portion of the body is arranged to receive and retain a ribbon 73 in the same manner as in the embodiment of Figure 1, the cap 74 being utilized to retain the ribbon in its slot. This form of the invention also utilizes anti-friction rollers 75 of a larger size, and is intended to serve only as a lead point.

In Figures 9, 10 and 11, I have shown a simplified form of the embodiment of Figure 7, the rollers being omitted. In this embodiment, the body 91 includes the nose 92 and is provided with the transverse slot 93 at its rearward end in which the ribbon 94 is arranged to engage in the manner shown and described for the embodiment of Figure 1.

It will now be noted that in the event of the lead wire being of such thickness that its bending is impracticable, as when it is to be used in installing heavy cables in conduit of large diameter and of considerable length, that it is preferably formed in short sections which may be detachably connected by units of my device arranged to receive and couple adjacent section ends together. In the embodiment of Figure 5, the two ends of the device therein shown are similarly formed, so that a lead wire end may be held in either end thereof to thus provide a coupling for the sections, while the substitution of lead wire receiving noses for the noses of the embodiments of Figures 1 and 9 would, in veiw of the foregoing, be an obvious expedient.

I claim:

1. A device of the character described comprising a cylindrical member having the different ends provided with axially directed perforations for the reception of the extremities of a lead line and a wire, and means within said member operative to releasably secure said extremities in said perforations.

2. A device of the character described comprising a generally cylindrical closed member having the different ends thereof tapered and provided with axial perforations for the reception of the extremities of a lead line and a wire respectively, and means within said member operative to releasably and independently secure said lead line and wire extremities to said member when disposed in said perforations.

In testimony whereof, I have hereunto set my hand at Oakland, California, this 15 day of October, 1925.

CLAUDE H. KEPLER.